United States Patent
Gutierrez et al.

(10) Patent No.: US 9,139,101 B2
(45) Date of Patent: Sep. 22, 2015

(54) ELECTRIC/HYBRID VEHICLE CHARGING STANDS AND ASSEMBLY METHODS THEREFOR

(76) Inventors: Abel Gutierrez, Taylor, MI (US); Chris Parenti, Novi, MI (US); Ralph Danny King, Taylor, MI (US)

( * ) Notice: Subject to any disclaimer, the term of this patent is extended or adjusted under 35 U.S.C. 154(b) by 443 days.

(21) Appl. No.: 13/561,694

(22) Filed: Jul. 30, 2012

(65) Prior Publication Data

US 2013/0026987 A1     Jan. 31, 2013

Related U.S. Application Data

(60) Provisional application No. 61/512,698, filed on Jul. 28, 2011.

(51) Int. Cl.
*H02J 7/00* (2006.01)
*B60L 11/18* (2006.01)

(52) U.S. Cl.
CPC ......... *B60L 11/1825* (2013.01); *B60L 11/1816* (2013.01); *B60L 2230/12* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y10T 29/49947* (2015.01)

(58) Field of Classification Search
CPC ......................................................... H02J 7/00
USPC .................................................. 320/108, 109
See application file for complete search history.

(56) References Cited

U.S. PATENT DOCUMENTS

| | | | | |
|---|---|---|---|---|
| 2010/0315040 A1* | 12/2010 | Sakurai | | 320/109 |
| 2012/0126747 A1* | 5/2012 | Kiko et al. | | 320/109 |
| 2012/0326664 A1* | 12/2012 | Venegas, Jr. | | 320/109 |
| 2013/0020990 A1* | 1/2013 | DeBoer et al. | | 320/109 |
| 2013/0134933 A1* | 5/2013 | Drew et al. | | 320/109 |

* cited by examiner

*Primary Examiner* — Mohammed Alam
(74) *Attorney, Agent, or Firm* — Gifford, Krass, Sprinkle, Anderson & Citkowski, P.C.

(57) ABSTRACT

An improved charging stand for electric or hybrid vehicles is based upon a two-piece construction. Different top sections may be used, including a plain top with a rounded end or a decorative top which may include an optional ambient light fixture. A single fastener may be placed through the top section and into the pipe to hold the entire assembly together. An upright pipe has a cutout to receive a recharge controller with a recharge cable, the pipe further including a slot to receive the cable. A first plastic sleeve has a height below the cutout in the pipe corresponding the bottom of the slot. The recharge controller is accessible through the cutout with the cable protruding through the slot. A second plastic sleeve with a closed top and an open bottom mates with top of the first plastic sleeve with a cutout corresponding to the cutout in the pipe.

18 Claims, 1 Drawing Sheet

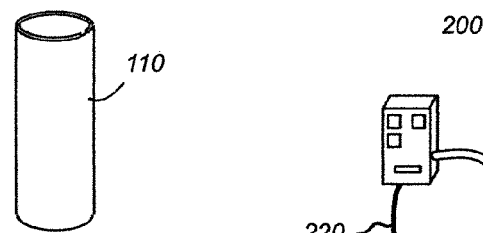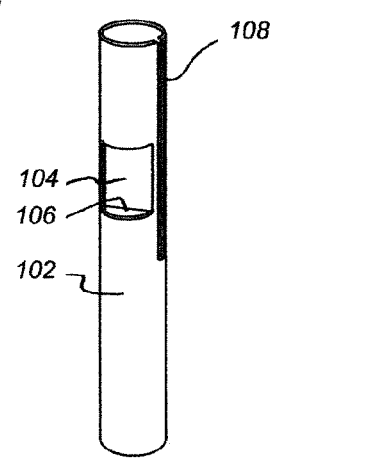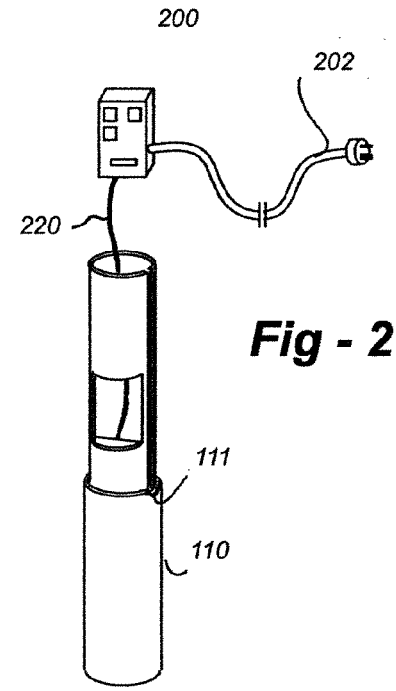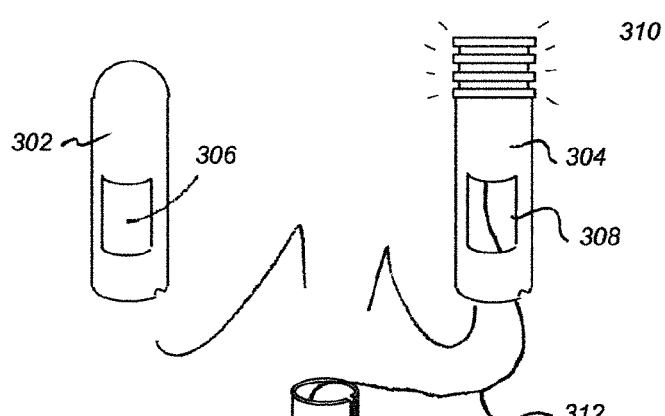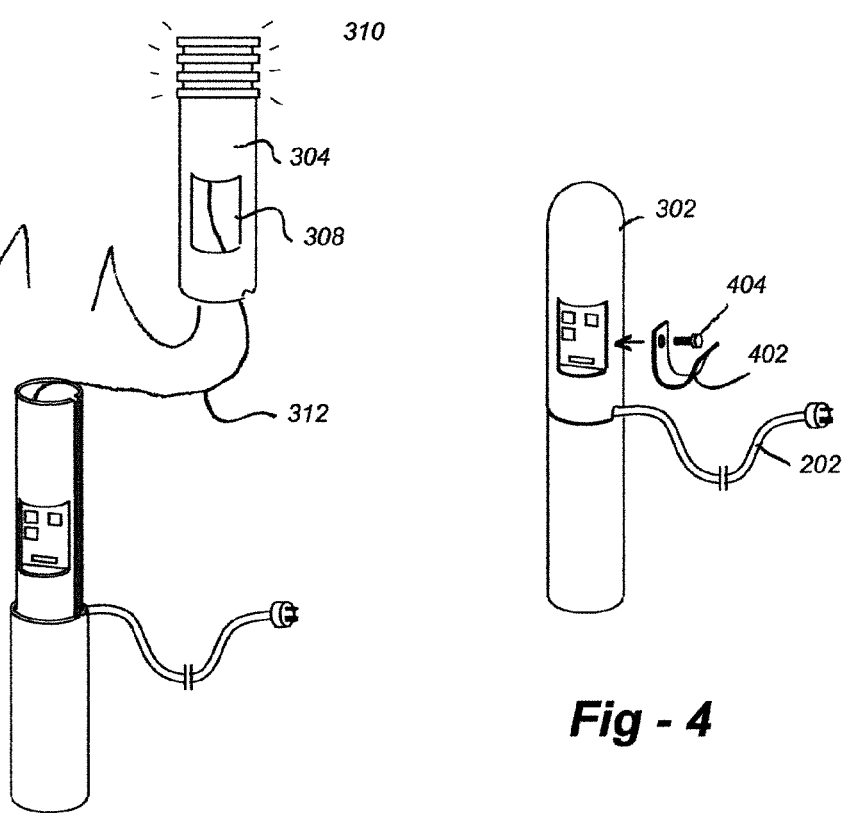

ELECTRIC/HYBRID VEHICLE CHARGING STANDS AND ASSEMBLY METHODS THEREFOR

REFERENCE TO RELATED APPLICATION

This application claims priority to U.S. Provisional Patent Application Ser. No. 61/512,698, filed Jul. 28, 2011, the entire content of which is incorporated herein by reference.

FIELD OF THE INVENTION

This invention resides in a method of assembling a charging stand for electric and hybrid-electric vehicles and the stand assembled thereby.

BACKGROUND OF THE INVENTION

The increasing popularity of electric and hybrid/electric vehicles has created a need for charging stands in numerous locations. Since the range of some such vehicles may be only a couple hundred miles, vehicle purchasers see a need for charging stands at home and at the office. This is in addition to the need for public pay-to-use charging stands at places providing long-term parking such as airports, parking structures, shopping malls and even metered parking lots and structures.

Certainly there are a number of commercially available designs for electric and hybrid/electric vehicle charging stands. However these are mostly proprietary units that offer little in terms of deployment versatility. As with nearly all charging stands, the purchaser or contractor routes an underground power line to a desired location, where there is placed a completed stand in a concrete footing or other appropriate foundation.

While existing charging stands provide for basic requisite utility, they do not facilitate on-site construction over existing metal tubes, posts, stanchions, bollards, or the like. How do existing designs facilitation on-site customization in terms of aesthetic appearance, optional lighting, and so forth.

SUMMARY OF THE INVENTION

This invention resides in an improved charging stand for electric or hybrid vehicles. In contrast to existing designs, a two-piece construction is used which offers several advantages in terms of on-site assembly and configuration options. One advantage of the invention is that different top sections may be alternatively be used, including a plain top with a rounded end or a decorative top which may include an optional ambient light fixture. Once the top sleeve section is installed, another advantage of the invention is that a single fastener may be placed through the top section and into the pipe to hold the entire assembly together.

A method of constructing a charging stand for electric or hybrid vehicles in accordance with the invention involves an upright pipe having a cutout to receive a recharge controller with a recharge cable, the pipe further including a slot to receive the cable. A first plastic sleeve is placed over the pipe, the first plastic sleeve having a height below the cutout in the pipe corresponding the bottom of the slot. The recharge controller is placed into the pipe so that it is accessible through the cutout and such that the cable protrudes through the slot. A second plastic sleeve is then placed over the pipe, the second plastic sleeve having a closed top and an open bottom that mates with top of the first plastic sleeve. The second plastic sleeve further includes a cutout that corresponds to the cutout in the pipe. At least one fastener may then be used to retain at least the second plastic sleeve to the pipe.

A charging stand for electric or hybrid vehicles constructed in accordance with the invention comprises an upright pipe having a cutout to receive a recharge controller with a recharge cable and a slot to receive the cable. The stand further includes a first plastic sleeve positioned over the pipe, the first sleeve having a height below the cutout in the pipe corresponding the bottom of the slot, wherein the recharge controller is mounted within the pipe such that it is accessible through the cutout and such that the cable protrudes through the slot. A second plastic sleeve is positioned over the pipe and over the first sleeve. The second plastic sleeve has a closed top and an open bottom that mates with top of the first plastic sleeve. The second plastic sleeve further includes a cutout that corresponds to the cutout in the pipe. A fastener is used to retain at least the second plastic sleeve to the pipe. In the preferred embodiment, a single fastener is used to retain the second plastic sleeve to the pipe which, in turn, retains the first plastic sleeve and the holds together the entire assembly.

BRIEF DESCRIPTION OF THE DRAWINGS

FIG. 1 depicts the assembly process associated with the preferred embodiment of the invention;

FIG. 2 shows a plastic sleeve slipped over an upstanding pipe;

FIG. 3 illustrates how a controller is slid into the pipe such that the cord associated with the controller protrudes through the slot; and FIG. 4 shows how a single fastener may be placed through the top section and into the pipe to hold the assembly together.

DETAILED DESCRIPTION OF THE INVENTION

The assembly process begins with an upstanding post or bollard 102 shown in FIG. 1. Such post may be a steel or other metal tube or pipe having a diameter on the order of 4 to 12 inches, more preferably in the range of 5-8 inches, with a wall thickness on the order of ⅛ to ½ inch or thereabouts.

In accordance with the invention, the pipe has a cutout 104 to receive an electric recharge controller 200 shown in FIGS. 2-4. The pipe also has a slot 108 to receive the cord 202 of the controller. The bottom of the cutout 104 preferably includes a ledge 106 upon which the controller rests. The ledge may be welded in the case of steel construction.

A first plastic sleeve 110 is slipped over the pipe 102 as shown in FIG. 2. The length of the first sleeve section is dimensioned to correspond to the bottom of the slot 108. The top edge of the bottom sleeve may include a notch 111. The controller 200 is then slid into the pipe such that the cord 202 protrudes through the slot as shown in FIG. 3. Power is supplied to the controller through a separate cable 220 that comes up through the pipe 102.

Next a second, top sleeve section is placed over the pipe. An advantage of the invention is that different top sections may be alternatively be used, including a plain top 302 with a rounded end or a decorative top 304 with an optional light fixture 310 connected to power through cable 312. Each top sleeve section includes a cut-out 306, 308 that corresponds to the cutout 104 in the pipe 102.

Once a top sleeve section is installed, another advantage of the invention is that a single fastener 404 may be placed through the top section and into the pipe to hold the assembly together, as shown in FIG. 4. Conveniently, the fastener may also be used to provide a holder 402 upon which to place the charging cable 202 when not in use.

The invention claimed is:

1. A method of constructing a charging stand for electric or hybrid vehicles, comprising the steps of:
   providing an upright pipe having a cutout to receive a recharge controller with a recharge cable, the pipe further including a slot to receive the cable;
   placing a first plastic sleeve over the pipe, the first plastic sleeve having a height below the cutout in the pipe corresponding the bottom of the slot;
   placing the recharge controller into the pipe so that it is accessible through the cutout and such that the cable protrudes through the slot;
   placing a second plastic sleeve over the pipe, the second plastic sleeve having a closed top and an open bottom that mates with top of the first plastic sleeve, the second plastic sleeve further including a cutout that corresponds to the cutout in the pipe; and
   providing a fastener to retain at least the second plastic sleeve to the pipe.

2. The method of claim 1, wherein the fastener retains both the first and second sleeves to the pipe.

3. The method of claim 1, wherein the fastener also holds a cable-retaining bracket.

4. The method of claim 1, wherein the second plastic sleeve further includes a light source to provide ambient lighting.

5. A recharging stand constructed in accordance with claim 1.

6. A recharging stand constructed in accordance with claim 3.

7. A recharging stand constructed in accordance with claim 4.

8. A method of constructing a charging stand for electric or hybrid vehicles over an existing, upright pipe, comprising the steps of:
   forming a cutout in the pipe to receive a recharge controller with a recharge cable;
   cutting a slot in the pipe to receive the cable;
   placing a first plastic sleeve over the pipe, the first plastic sleeve having a height below the cutout in the pipe corresponding the bottom of the slot;
   placing the recharge controller into the pipe so that it is accessible through the cutout and such that the cable protrudes through the slot;
   placing a second plastic sleeve over the pipe, the second plastic sleeve having a closed top and an open bottom that mates with top of the first plastic sleeve, the second plastic sleeve further including a cutout that corresponds to the cutout in the pipe; and
   providing a fastener to retain at least the second plastic sleeve to the pipe.

9. The method of claim 8, wherein the fastener retains both the first and second sleeves to the pipe.

10. The method of claim 8, wherein the fastener also holds a cable-retaining bracket.

11. The method of claim 8, wherein the second plastic sleeve further includes a light source to provide ambient lighting.

12. A recharging stand constructed in accordance with claim 9.

13. A recharging stand constructed in accordance with claim 10.

14. A recharging stand constructed in accordance with claim 11.

15. A charging stand for electric or hybrid vehicles, comprising:
   an upright pipe having a cutout to receive a recharge controller with a recharge cable and a slot to receive the cable;
   a first plastic sleeve positioned over the pipe, the first sleeve having a height below the cutout in the pipe corresponding the bottom of the slot, wherein the recharge controller is mounted within the pipe such that it is accessible through the cutout and such that the cable protrudes through the slot;
   a second plastic sleeve positioned over the pipe and over the first sleeve, the second plastic sleeve having a closed top and an open bottom that mates with top of the first plastic sleeve, the second plastic sleeve further including a cutout that corresponds to the cutout in the pipe; and
   a fastener to retain at least the second plastic sleeve to the pipe.

16. The charging stand of claim 15, wherein the fastener retains both the first and second sleeves to the pipe.

17. The charging stand of claim 15, wherein the fastener also holds a cable-retaining bracket.

18. The charging stand of claim 15, wherein the second plastic sleeve further includes a light source to provide ambient lighting.

* * * * *